(12) United States Patent
Arberg et al.

(10) Patent No.: US 7,031,304 B1
(45) Date of Patent: Apr. 18, 2006

(54) METHOD AND APPARATUS FOR SELECTIVE PACKET MIRRORING

(75) Inventors: Peter Arberg, Hojbjerg (DK); Ravi Chandra, Los Gatos, CA (US); Michail Krupkin, New Westminster (CA)

(73) Assignee: Redback Networks Inc., San Jose, CA (US)

( * ) Notice: Subject to any disclaimer, the term of this patent is extended or adjusted under 35 U.S.C. 154(b) by 31 days.

(21) Appl. No.: 10/292,161

(22) Filed: Nov. 12, 2002

Related U.S. Application Data

(60) Provisional application No. 60/409,795, filed on Sep. 11, 2002.

(51) Int. Cl.
*H04L 12/50* (2006.01)
*H04L 12/28* (2006.01)

(52) U.S. Cl. .................... 370/360; 370/390; 370/392

(58) Field of Classification Search ............. 370/241, 370/252, 390, 397, 399, 432, 465, 235, 256, 370/359.2, 395.21, 409
See application file for complete search history.

(56) References Cited

U.S. PATENT DOCUMENTS

| | | | | | |
|---|---|---|---|---|---|
| 4,736,465 | A | * | 4/1988 | Bobey et al. ............... | 398/66 |
| 5,345,445 | A | * | 9/1994 | Hiller et al. ............... | 370/358 |
| 5,345,446 | A | * | 9/1994 | Hiller et al. ............... | 370/358 |
| 5,930,259 | A | * | 7/1999 | Katsube et al. ............. | 370/409 |
| 6,041,042 | A | * | 3/2000 | Bussiere ..................... | 370/245 |
| 6,167,051 | A | * | 12/2000 | Nagami et al. ............. | 370/397 |
| 6,202,082 | B1 | * | 3/2001 | Tomizawa et al. .......... | 709/201 |
| 6,356,553 | B1 | * | 3/2002 | Nagami et al. ............. | 370/397 |
| 6,598,092 | B1 | * | 7/2003 | Tomizawa et al. .......... | 709/251 |
| 6,751,746 | B1 | * | 6/2004 | Jain et al. .................. | 714/4 |
| 6,850,495 | B1 | * | 2/2005 | Baum et al. ................ | 370/256 |
| 6,894,970 | B1 | * | 5/2005 | McDermott et al. ........ | 370/220 |
| 2002/0041592 | A1 | * | 4/2002 | Van Der Zee et al. ...... | 370/389 |
| 2002/0075880 | A1 | * | 6/2002 | Dollnar et al. ............. | 370/401 |
| 2003/0039212 | A1 | * | 2/2003 | Lloyd et al. ................ | 370/235 |
| 2003/0058804 | A1 | | 3/2003 | Saleh et al. | |
| 2003/0163554 | A1 | * | 8/2003 | Sendrowicz ................ | 709/220 |
| 2004/0003094 | A1 | * | 1/2004 | See ............................ | 709/227 |
| 2004/0037279 | A1 | * | 2/2004 | Zelig et al. ................. | 370/390 |
| 2004/0042418 | A1 | * | 3/2004 | Hamada et al. ............ | 370/256 |
| 2005/0157664 | A1 | * | 7/2005 | Baum et al. ................ | 370/256 |

FOREIGN PATENT DOCUMENTS

WO    PCT/US03/21623    4/2004

* cited by examiner

*Primary Examiner*—Hassan Kizou
*Assistant Examiner*—Hong Sol Cho
(74) *Attorney, Agent, or Firm*—Blakely, Sokoloff, Taylor & Zafman LLP

(57) ABSTRACT

A method and apparatus for selectively packet mirroring is described. A method in a network element comprises selectively mirroring packets, the packets being associated with a first virtual path, the first virtual path indicating a first physical path and a first virtual path identifier and the selectively mirrored packets forwarded in accordance with a second virtual path, said second virtual path indicating a second physical path and a second virtual path identifier.

39 Claims, 12 Drawing Sheets

NETWORK ELEMENT
100

| CLASS | FORWARDING INFORMATION | |
|---|---|---|
| | FORWARDING DESTINATION | MODE |
| 0 | NULL | NONE |
| 1 | SLOT 1/PORT 1 | FORWARDED |
| 2 | VC 100 | DROPPED |
| ... | ... | ... |
| ... | ... | ... |
| 7 | MIRROR_TUNNEL | ALL |

MIRROR CLASSIFICATION STRUCTURE
201

FIG. 2

METHOD AND APPARATUS FOR SELECTIVE PACKET MIRRORING

CROSS-REFERENCE TO RELATED APPLICATIONS

This application claims the benefit of U.S. Provisional Patent Application No. 60/409,795, entitled "Method and Apparatus for Selective Packet Mirroring" filed on Sep. 11, 2002.

BACKGROUND OF THE INVENTION

1. Field of the Invention

The invention relates to the field of communication. More specifically, the invention relates to communication networks.

2. Background of the Invention

Traffic mirroring is the duplication of data traffic and forwarding of the duplicate data traffic to a specified host. The duplicate traffic is forwarded to the specified host for any of a number of purposes including analysis of traffic, analysis of network equipment, lawful interception, etc.

One method of traffic mirroring is signal duplication. With signal duplication, a network element must include special hardware to duplicate a signal at the physical layer. The duplicate signal is directed to a predefined port of the network element.

Unfortunately, signal duplication requires special hardware to duplicate signals. In addition, a single signal can carry multiple streams of traffic. Although only a single stream of traffic may be of interest, resources are consumed duplicating the entire signal and forwarding the entire signal.

Another method of traffic mirroring is stream duplication. With stream duplication, a single stream of traffic is duplicated and the duplicate stream is directed to a predefined port.

Stream duplication enables a stream from a signal to be duplicated, thus reducing resources expended on streams of no interest. The stream duplication still wastes resources duplicating packets that may be of no interest and forwarding duplicate packets that may be of no interest.

Both signal duplication and stream duplication waste resources on packets that may be of no interest and waste the port that is dedicated to forwarding duplicate traffic. Furthermore, collection and analysis of duplicate traffic cannot be spread throughout a network.

BRIEF SUMMARY OF THE INVENTION

A method and apparatus for selective packet mirroring is described. According to one aspect of the invention, a method in a network element provides for selectively mirroring packets, the packets being associated with a first virtual path. The first virtual path indicates a first physical path and a first virtual path identifier. The selectively mirrored packets are forwarded in accordance with a second virtual path, said second virtual path indicating a second physical path and a second virtual path identifier.

These and other aspects of the present invention will be better described with reference to the Detailed Description and the accompanying Figures.

BRIEF DESCRIPTION OF THE DRAWINGS

The invention may best be understood by referring to the following description and accompanying drawings that are used to illustrate embodiments of the invention. In the drawings:

FIG. 2 is a diagram of an exemplary mirror classification structure according to one embodiment of the invention.

DETAILED DESCRIPTION OF THE INVENTION

In the following description, numerous specific details are set forth to provide a thorough understanding of the invention. However, it is understood that the invention may be practiced without these specific details. In other instances, well-known circuits, structures, standards, and techniques have not been shown in detail in order not to obscure the invention.

Figure 1:
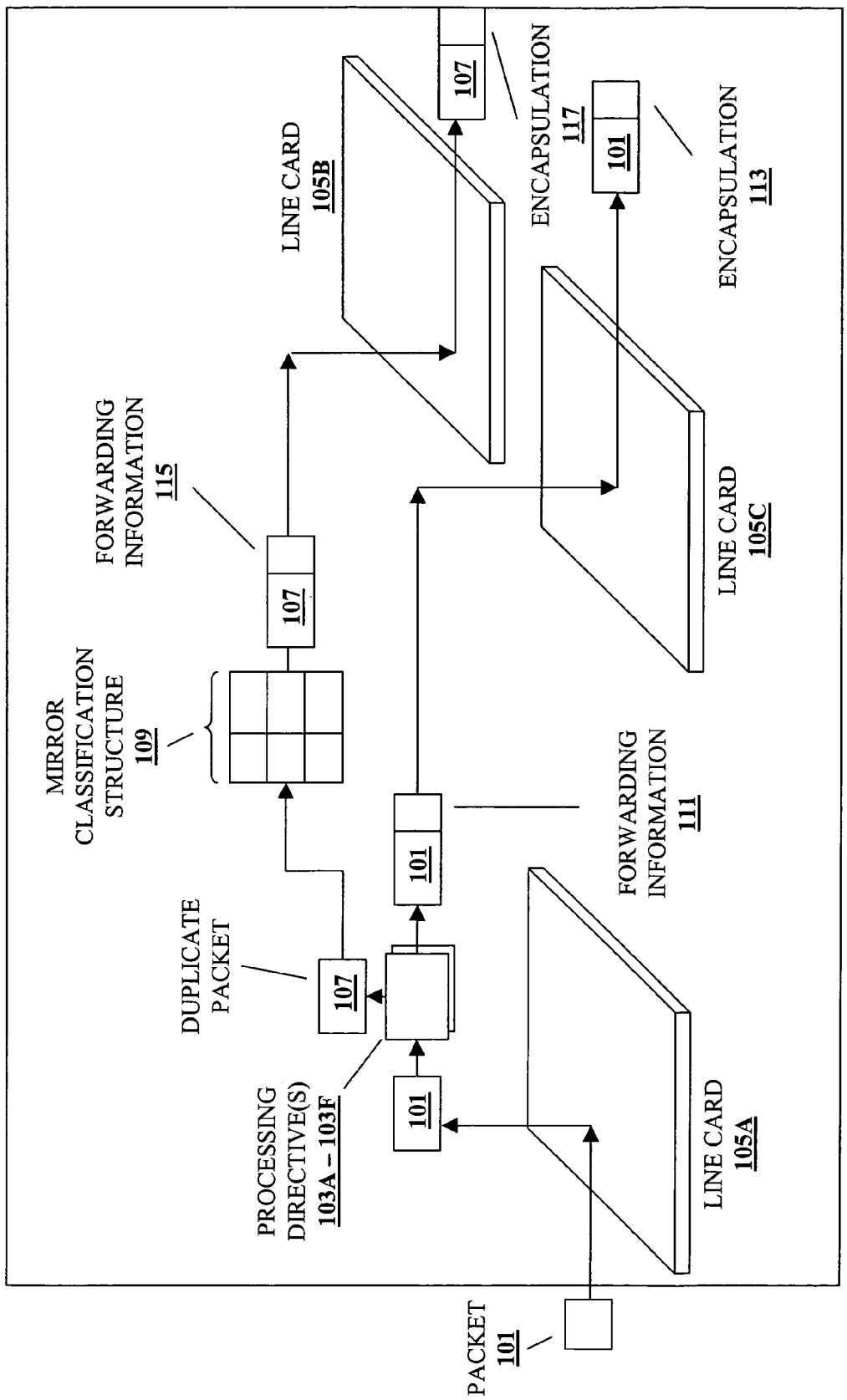
FIG. 1 is a conceptual diagram of exemplary packet mirroring from an ingress path in a network element according to one embodiment of the invention.

FIG. 1 is a conceptual diagram of exemplary packet mirroring from an ingress path in a network element according to one embodiment of the invention. In FIG. 1, a network element 100 includes line cards 105A–105C. The line card 105A receives a stream of packets including a packet 101. The packet 101 is processed at a layer above the physical layer. The line card 105A processes the packet 101 in accordance with processing directive(s) 103A–103F. The processing directive(s) 103A–103F indicate how to process the packet 101. In the illustration of FIG. 1, the processing directive(s) 103A–103F indicated the packet 101 is a candidate for mirroring. As a result, a duplicate packet 107 is generated from the packet 101. The line card 105A continues to process the packet 101 in accordance with the processing directive(s) 103A–103F. From the processing directive(s) 103A–103F, the line card 105A determines forwarding information 111 that is transmitted with the packet 101 to the line card 105C. The line card 105C encapsulates the packet 101 with encapsulation 113 in accordance with the forwarding information 111.

The duplicate packet 107 is processed by the line card 105A in accordance with a mirror classification structure 109. The line card 105A classifies the duplicate packet 107 based on the processing of the packet 101. The classification of the duplicate packet 107 is used to select the appropriate entry in the mirror classification structure 109. The line card 105A transmits the duplicate packet 107 and forwarding information 115, ascertained from the selected entry in the mirror classification structure 109, to the line card 105B. The line card 105 encapsulates the duplicate packet 107 with encapsulation 117 in accordance with the forwarding information 115. The packet 101 and the duplicate packet 107 may be transmitted from the receiving line card to the same transmitting line card. For example, the duplicate packet 107 and the packet 101 may be transmitted from the line card 105A to the line card 105C, but different ports on the line card 105C. In another example, the line card 105A transmits the packet 101 and the duplicate packet 107 to the same port on the line card 105C.

FIG. 2 is a diagram of an exemplary mirror classification structure according to one embodiment of the invention. In a mirror classification structure 201, a first column indicates class. A second and a third column of the mirror classification structure 201 indicate forwarding information. The second column of each entry in the mirror classification structure indicates a forwarding destination and the third column of each entry indicates a mode. Each entry of the mirror classification structure 201 corresponds to a different class. In the example illustrated in FIG. 2, the mirror classification structure 201 includes eight different classes. Each class is associated with different forwarding information. For example, if a duplicate packet is categorized as class 0, then the duplicate packet is dropped and not forwarded because the forwarding destination indicates null and the mode indicates none. Class 0 does not have to correspond to dropping a duplicate packet, and a number of different values and/or flags can be utilized to indicate that the duplicate packet should be dropped (i.e., delete the duplicate packet). The second entry indicates class 1 and its corresponding forwarding destination indicates "slot 1/port 1" and a mode "forwarded." A duplicate packet classified as class 1 will be forwarded to the designated forwarding destination only if the corresponding original packet was forwarded. The third entry indicates class 2 and its corresponding forwarding destination indicates "VC 100" (i.e., virtual circuit 100) and a mode "dropped." A duplicated packet classified as class 2 will be forwarded along VC 100 only if the corresponding original packet was dropped. The last entry indicates a class 7 and its corresponding forwarding destination a tunnel name "MIRROR_TUNNEL" and a mode "ALL." All duplicate packets falling within class 7 will be forwarded along the tunnel "MIRROR_TUNNEL." It should be understood that the class and forwarding information illustrated in FIG. 2 are for illustrative purposes only, and not meant to be limiting upon the invention.

Figure 3:
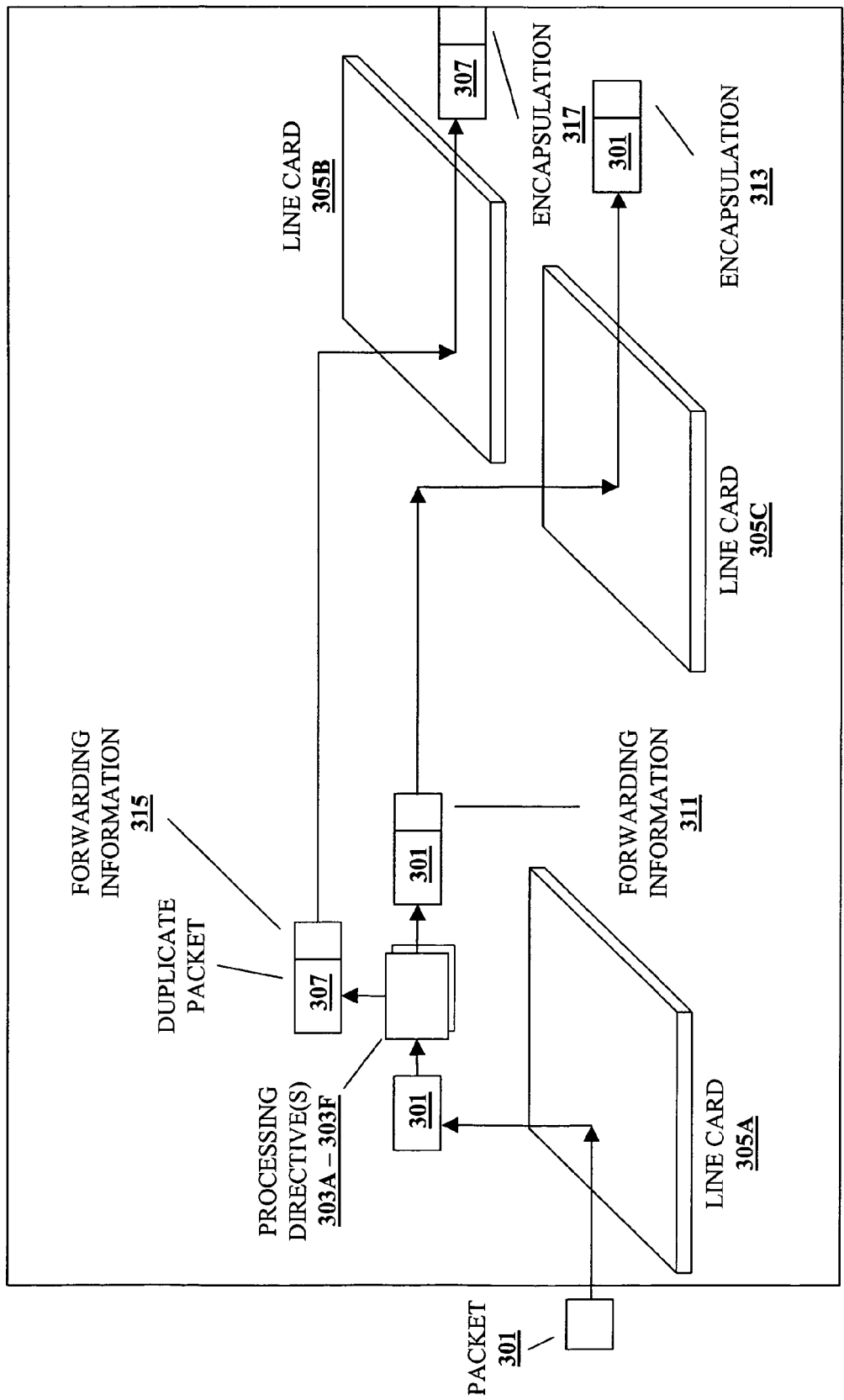
FIG. 3 is a conceptual diagram of packet mirroring from an ingress path in an alternative exemplary network element according to one embodiment of the invention.

FIG. 3 is a conceptual diagram of packet mirroring from an ingress path in an alternative exemplary network element according to one embodiment of the invention. In FIG. 3, network element 300 includes line cards 305A–305C. The line card 305A receives a stream of packets including a packet 301. As in FIG. 1, the packet 301 is processed at a layer above the physical layer (e.g., the link layer, data layer, network layer, etc.). Similar to FIG. 2, the line card 305A processes the packet 301 in accordance with processing directive(s) 303A–303F. The processing directive(s) 303A–303F indicate that the packets of the stream that includes packet 301 may be mirrored. The line card 305A copies the packet 301 and generates a duplicate packet 307. The processing directive(s) 303A–303F also indicate forwarding information 315 for the duplicate packet 307. The line card 305A continues to process the original packet 301 in accordance with the remaining ones of the processing directive(s) 303A–303F. The line card 305A transmits the packet 301 with forwarding information 311 indicated by the processing directive(s) 303A–303F to the line card 305C, assuming the forwarding information 311 indicates the line card 305C.

As in FIG. 3, the line card 305C encapsulates the packet 301 with encapsulation 313 in accordance with the forwarding information 311.

The line card 305A determines if the duplicate packet 307 should be forwarded based on processing of the packet 301. If the duplicate packet should not be forwarded, then the duplicate packet 307 and the forwarding information 315 are discarded. If the duplicate packet should be forwarded, then the line card 305A sends the duplicate packet 307 and the forwarding information 315 to the line card 305B, assuming the forwarding information 315 indicates the line card 305B. Similar to FIG. 2, the line card 305B encapsulates the duplicate packet 307 with encapsulation 317 in accordance with the forwarding information 315.

Mirroring traffic on a packet per packet basis provides a higher level of granularity for traffic mirroring which enables flexibility and reduction of resources expended for mirroring. Individual packets of a stream can be screened to determine whether the packet should be mirrored, hence entire streams are not wastefully transmitted. Although an entire stream of packets can still be mirrored, individual packets can be targeted for analysis or lawful interception.

Figure 4:
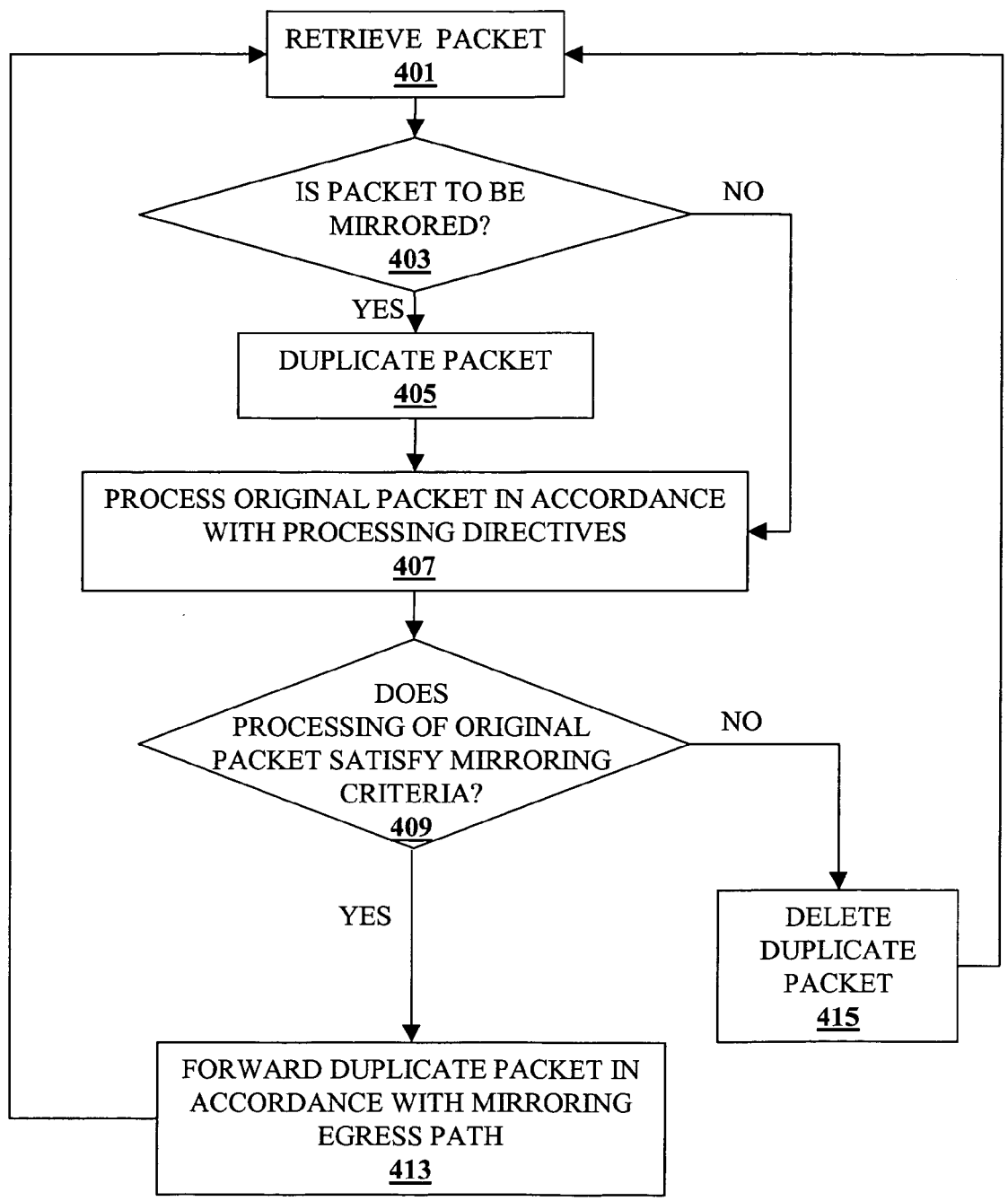
FIG. 4 is an exemplary flowchart for packet mirroring according to one embodiment of the invention.

FIG. 4 is an exemplary flowchart for packet mirroring according to one embodiment of the invention. At block 401, a packet is retrieved. At block 403, it is determined if the retrieved packet is to be mirrored. If the retrieved packet is to be mirrored, then control flows to block 405. If the retrieved packet is not to be mirrored, then control flows block 407.

At block 405, the packet is duplicated. At block 407, the original packet is processed in accordance with one or more processing directives. At block 409, it is determined if the processing of the original packet satisfies a mirroring criteria. If the processing of the original packet satisfies the mirroring criteria, then control flows to block 413. If processing of the original packet does not satisfy the mirroring criteria, then control flows block 415. The one or more mirroring criteria are configured on the subject network element.

Figure 5:
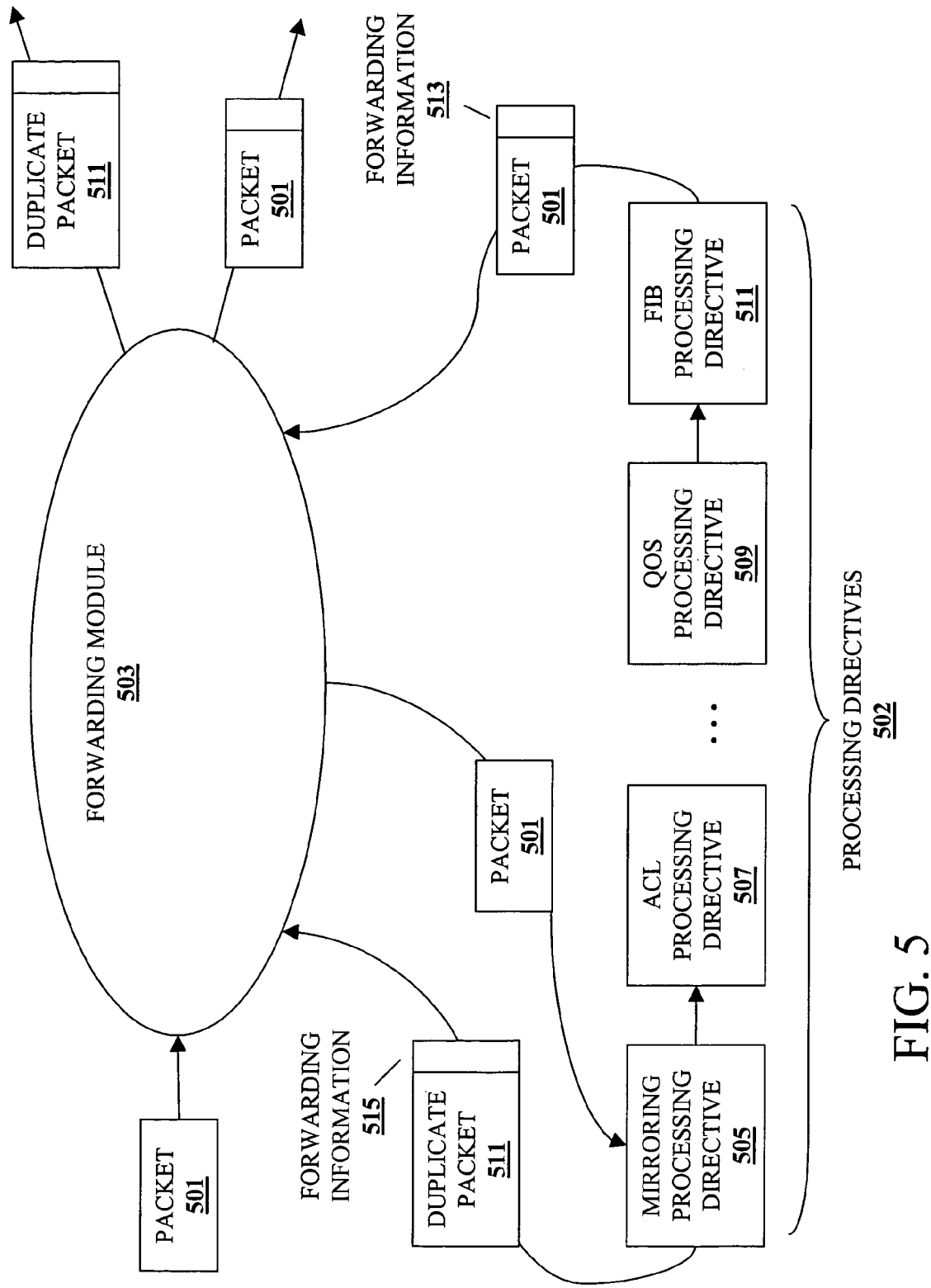
FIG. 5 is a conceptual diagram illustrating a forwarding module processing a packet to be mirrored in accordance with one embodiment of the invention.

FIG. 5 is a conceptual diagram illustrating a forwarding module processing a packet to be mirrored in accordance with one embodiment of the invention. A forwarding module 503 retrieves a packet 501 for processing. The forwarding module processes the packet 501 in accordance with a set of processing directives 502. Each of the processing directives indicate how the packet 501 is to be processed. In one embodiment of the invention, processing directives are implemented as object oriented pieces of software or code, each of which has a specific function. In the example illustrated in FIG. 5, each processing directive can be linked with another processing directive to create a sequence of processing directives for processing a packet. In FIG. 5, the forwarding module 503 initially processes the packet 501 in accordance with the mirroring processing directive 505. The mirroring processing directive 505 causes the forwarding module 503 to copy the packet 501 and generate a duplicate packet 511. The mirroring processing directive indicates forwarding information 515 which is associated with the duplicate packet 511. The forwarding module then processes the packet 501 in accordance with an access control list (ACL) processing directive 507. A set of one or more mirroring criteria is indicated in the ACL processing directive 507. The set of mirroring criteria may indicate that dropped packets are to be mirrored, forwarded packets are to be mirrored, denied packets are to be mirrored, allowed packets are to be mirrored, etc. The forwarding module 503 processes the packet 501 according to the quality of service (QoS) processing directive 509 and the forwarding information base (FIB) processing directive 511. The FIB processing directive 511 includes an entry that indicates forwarding information 513 corresponding to the packet 501. The forwarding module 503 transmits the packet 501 in accordance with the forwarding information 513. If the packet 501 satisfied the mirroring criteria indicated in the ACL processing directive 507, then the forwarding module transmits the duplicate packet 511 according to the forwarding information 515. The duplicate packet may also be processed by a sequence of processing directives.

Alternative embodiments of the invention may implement mirroring criteria differently. In one embodiment of the invention, the mirroring criteria are not indicated in the ACL processing directive, but in the mirroring processing directive. In another embodiment of the invention, the mirroring criteria is the forwarding information indicated in the mirroring processing directive (i.e., all packets processed with the sequence of processing directives are mirrored with the forwarding information). In another embodiment of the invention, the mirroring criteria is indicated in the ACL processing directive 507 includes the mirroring forwarding information.

Figure 6:
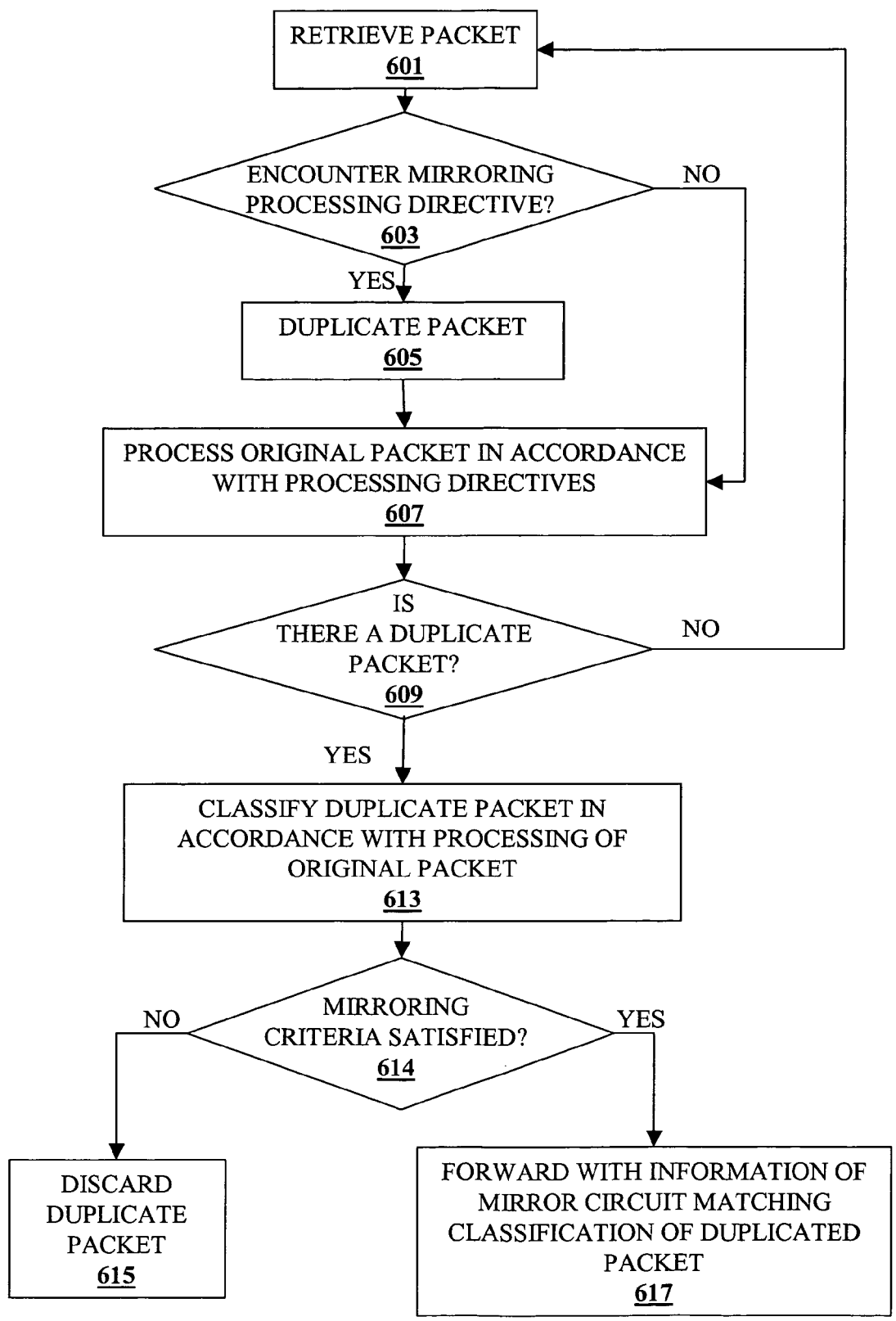
FIG. 6 is an exemplary flowchart for classifying and mirroring packets according to one embodiment of the invention.

FIG. 6 is an exemplary flowchart for classifying and mirroring packets according to one embodiment of the invention. At block 601, a packet is retrieved. At block 603, it is determined if a mirroring processing directive is encountered. If a mirroring processing directive is not encountered, then control flows to block 607. If a mirroring processing directive is encountered, the control flows to block 605. At block 607, the original packet is processed in accordance with processing directives. At block 609, is determined if there is a duplicate packet. If there is not a duplicate packet, then control flows back to block 601 into a duplicate packet, then control flows block 613.

At block 613, the duplicate packet is classified in accordance with processing of the original packet. In one embodiment of the invention, a classification for the duplicate packet is stored in memory after the corresponding original packet is processed. At block 614, it is determined if the mirroring criteria are satisfied. If the mirroring criteria are not satisfied, then control flows to block 615. If the mirroring criteria are satisfied, then control flows to block 617.

At block 615, the duplicate packet is discarded.

At block 617, the duplicate packet is forwarded with forwarding information for a mirroring path (e.g., a virtual circuit, tunnel, etc.) matching the classification of the duplicate packet.

Figure 7A:
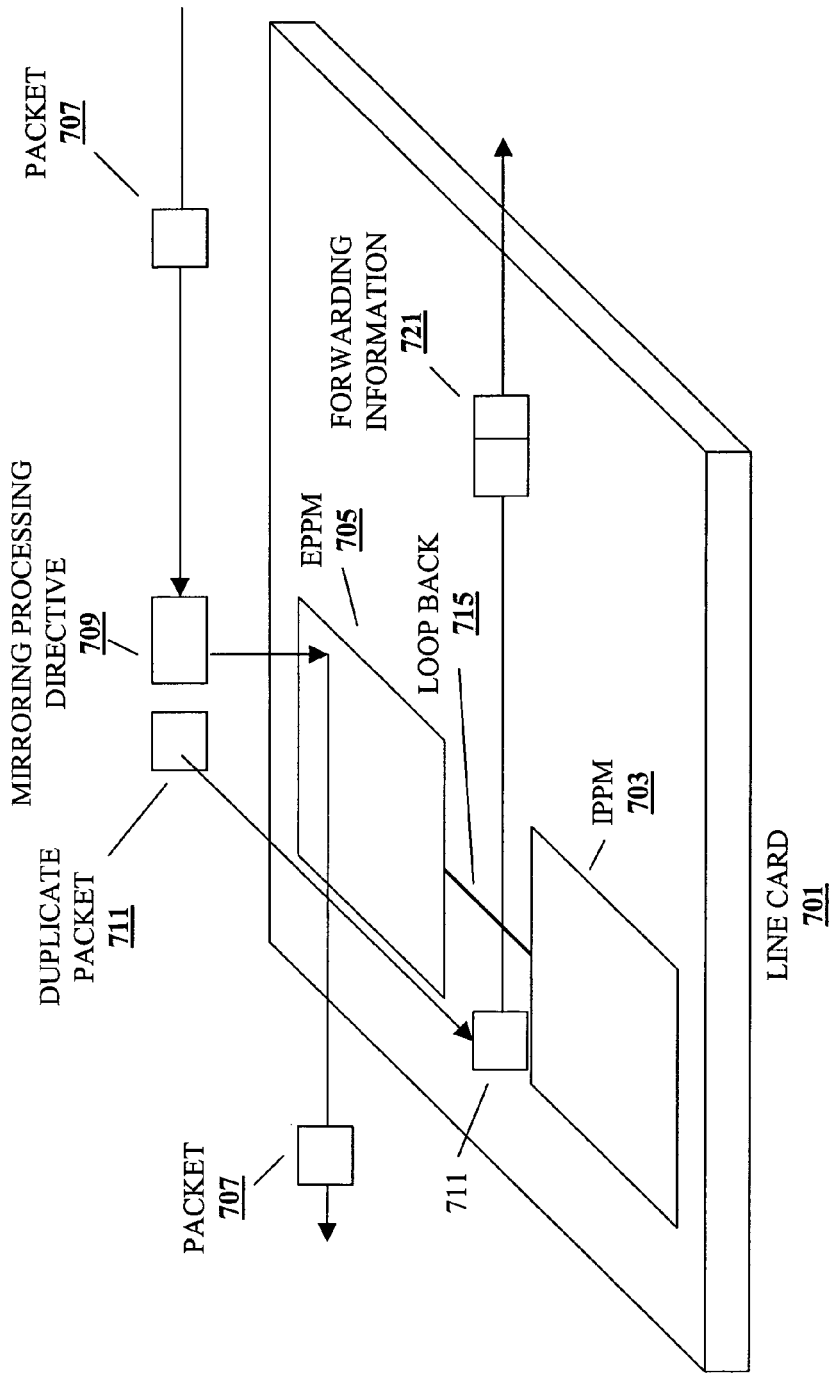
FIG. 7A is a conceptual diagram illustrating an exemplary line card mirroring a packet from an egress path according to one embodiment of the invention.

FIG. 7A is a conceptual diagram illustrating an exemplary line card mirroring a packet from an egress path according to one embodiment of the invention. In FIG. 7A, a line card 701 includes an egress packet processing module (EPPM) 705, an ingress packet processing module (IPPM) 703, and a loop back 715. The loop back 715 provides a direct data path from between the IPPM and the EPPM. The EPPM 705 receives a packet 707. The EPPM processes the packet 707 in accordance with a mirroring processing directives 709. The mirroring processing directive 709 causes the EPPM 705 to generate a duplicate packet 711 from the packet 707. The EPPM 705 transmits the packet 707 from the line card 701 and passes the duplicate packet 711 to the IPPM 703. The IPPM 703 forwards the duplicate packet 711 in accordance with forwarding information 721 previously received when the mirroring was configured for the EPPM 705.

Figure 7B:
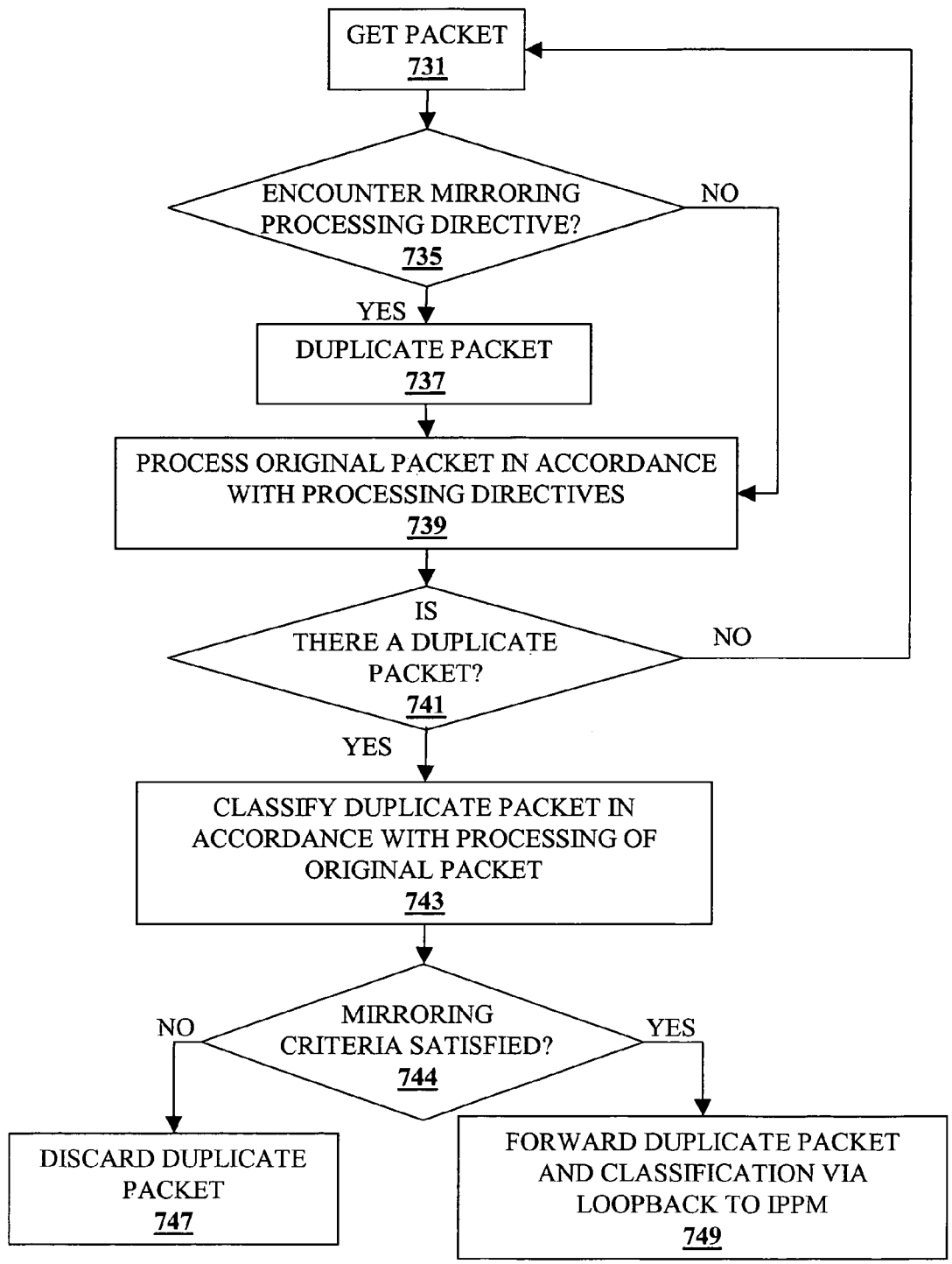
FIG. 7B is an exemplary flowchart for packet mirroring from an egress path on an EPPM according to one embodiment of the invention.

FIG. 7B is an exemplary flowchart for packet mirroring from an egress path on an EPPM according to one embodiment of the invention. At block 731, a packet is retrieved. At block 735, it is determined if a mirroring processing directive is encountered. If a mirroring processing directive is not encountered, then control flows to block 739. If a mirroring processing directive is encountered, then control flows to block 737.

At block 737, the original packet is processed in accordance with processing directives. At block 739, it is determined if there is a duplicate packet. If there is not a duplicate packet, then control flows back to block 731. If there is a duplicate packet, then control flows block 743.

At block 743, the duplicate packet is classified in accordance with processing of the original packet. At block 745, is determined if the mirroring criteria is satisfied. If the mirroring criteria is not satisfied, then control flows to block 747. If the mirroring criteria is satisfied, then control flows to block 749.

At block 747, the duplicate packet is discarded.

At block 749, the duplicate packet is forwarded along with classification information via a loopback channel to the corresponding IPPM.

Figure 7C:
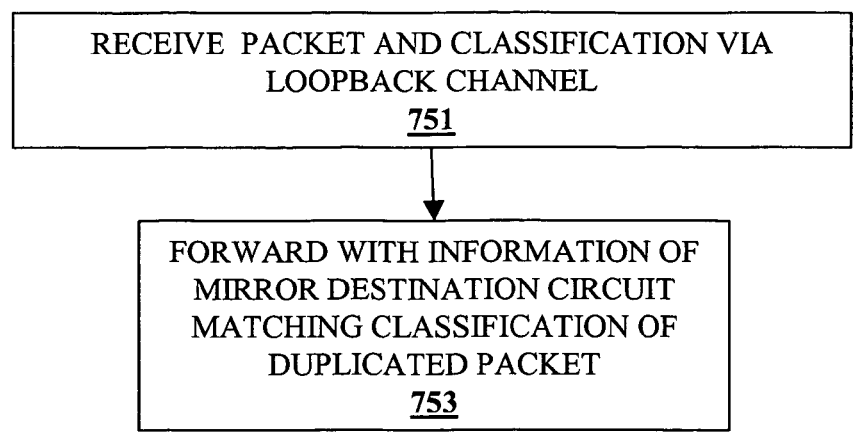
FIG. 7C is an exemplary flowchart for packet mirroring from an egress path on an IPPM according to one embodiment of the invention.

FIG. 7C is an exemplary flowchart for packet mirroring from an egress path on an IPPM according to one embodiment of the invention. At block 751, a packet and its classification are received via a loopback channel. At block 753, the packet is forwarded in accordance with forwarding information of a mirror destination circuit that matches the classification of the duplicate packet.

Figure 8:
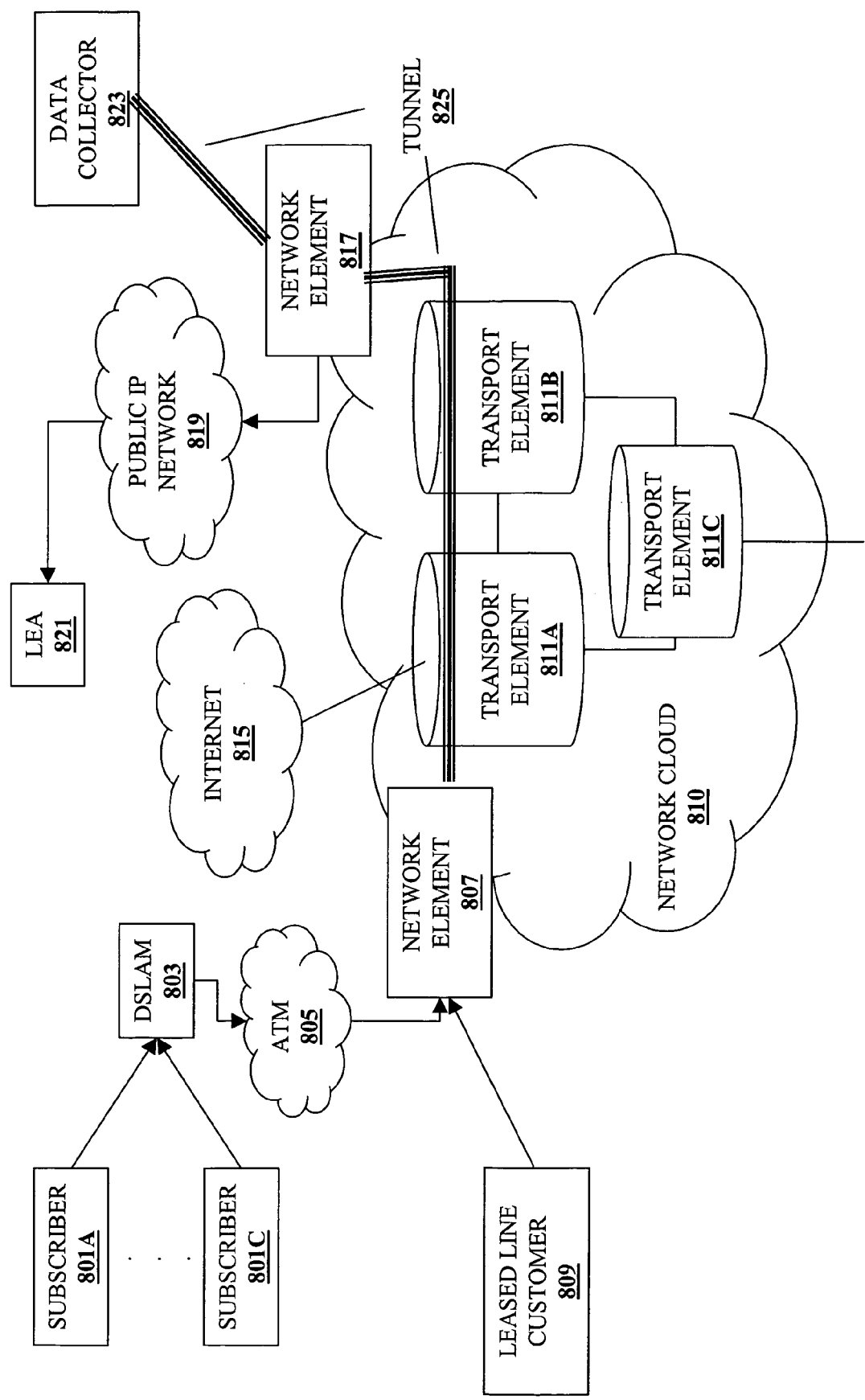
FIG. 8 is a diagram illustrating an exemplary network with distributed data collection of mirrored packets according to one embodiment of the invention.

FIG. 8 is a diagram illustrating an exemplary network with distributed data collection of mirrored packets according to one embodiment of the invention. In FIG. 8, a set of subscribers 801A–801C are coupled with a digital subscriber access multiplexer (DSLAM) 803. The DSLAM 803 is coupled with an ATM cloud 805. The ATM cloud is coupled with a network element 807. A leased line customer (e.g., a business) 809 is also coupled with the network element 807. The network element 807 is at the edge of a network cloud 810. The network cloud 810 includes transport elements 811A–811C, which are coupled with each other. The transport element 811A is also coupled with the Internet 815. The transport element 811B is coupled with a network element 817. The network element 817 is coupled with a data collector 823 (e.g., a host, server, etc.) and a public internet protocol (IP) network cloud 819. The public IP network cloud 819 is coupled with a law enforcement agency (LEA) 821.

The network element 807 can receive traffic through leased lines, packet over SONET interface, an Ethernet interface, a virtual local area network (VLAN) interface, an ATM PVC, etc. In FIG. 8, the network element 807 receives traffic from the set of subscribers 801A–801C and the leased line customer 809. With selective packet mirroring, the network element 807 can selectively mirror packets from the set of subscribers 801A–801C and the leased line customer 809. In this illustration, the network element 807 has been configured to forward duplicate packets via the tunnel 825 to the data collector 823. The network element 807 can forward duplicate packets by means other than or in addition to the tunnel 825, but for this illustration, all mirrored packets are forwarded along the tunnel 825 through the transport elements 811A, 811B, and the network element 817 to the data collector 823.

The network element 817 forwards packets received over the tunnel 825 to the data collector 823 and/or the LEA 821, if so configured. For this illustration it is also assumed that the network elements 807 and 817 have been configured with mirroring criteria specified by the owner of the data collector and/or the LEA 821. The network element 817 mirrors selected packets, received from sources not illustrated in Figure, matching configured mirroring criteria to the LEA and/or data collector 823.

Selective packet mirroring enables the flexibility necessary to optimally utilize resources and avoid centralized data collection of mirrored traffic. In addition, packets from the same stream of different stream can be mirrored to multiple entities. Potential profit from a port is not lost since the port does not have to be dedicated to packet mirroring and the functionality of selectively packet mirroring packets to multiple destinations is provided.

Selective packet mirroring also provides for network analysis and development debugging without disturbing the network. Dropped packets can be mirrored to a host for analysis. Denial of service attacks can be traced back by analyzing dropped packets.

Moreover, selective packet mirroring can be utilized with virtual routers. In one embodiment of the invention, a virtual router is provisioned for mirroring to a law enforcement agency. The law enforcement agency can configure the virtual router and specify mirroring criteria without the interference of a middleman. In another embodiment of the invention, a subscriber can be dynamically or statically bound to a virtual router for special attention. The virtual router will have its own IP address pool, logging servers, etc.

Figure 9:
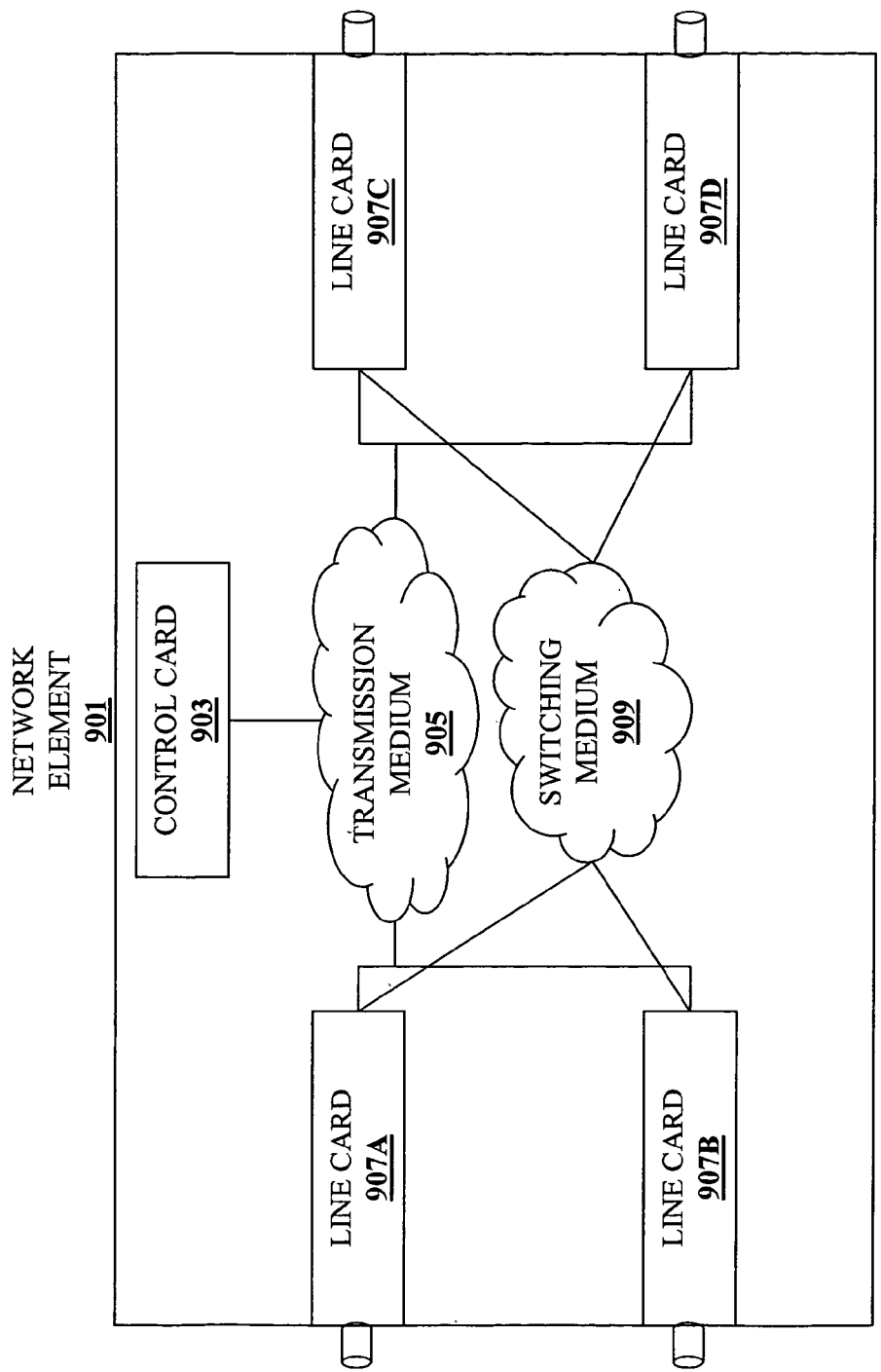
FIG. 9 is an exemplary diagram of a network element according to one embodiment of the invention.

FIG. 9 is an exemplary diagram of a network element according to one embodiment of the invention. In FIG. 9, a network element 901 includes a control card 903. The control card 903 is coupled with a transmission medium 905 (e.g., a system bus). The transmission medium 905 is coupled with the line cards 907A–907D. The transmission medium 905 carries information from the control card 903 to the line cards 907A–907D. The line cards 907A–907D are coupled with each other via the switching medium 909. The switching medium may be a separate switching unit including hardware and/or software to determine which line card to forward traffic to. Alternatively, the switching medium may be a mesh.

The network elements described in the Figures include memories, processors, and/or ASICs. Such memories include a machine-readable medium on which is stored a set of instructions (i.e., software) embodying any one, or all, of the methodologies described herein. Software can reside, completely or at least partially, within this memory and/or within the processor and/or ASICs. For the purpose of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media, optical storage media, flash memory devices, electrical, optical, acoustical, or other forms of propagated signals (e.g., carrier waves, infrared signals, digital signals, etc.), etc.

Figure 10:
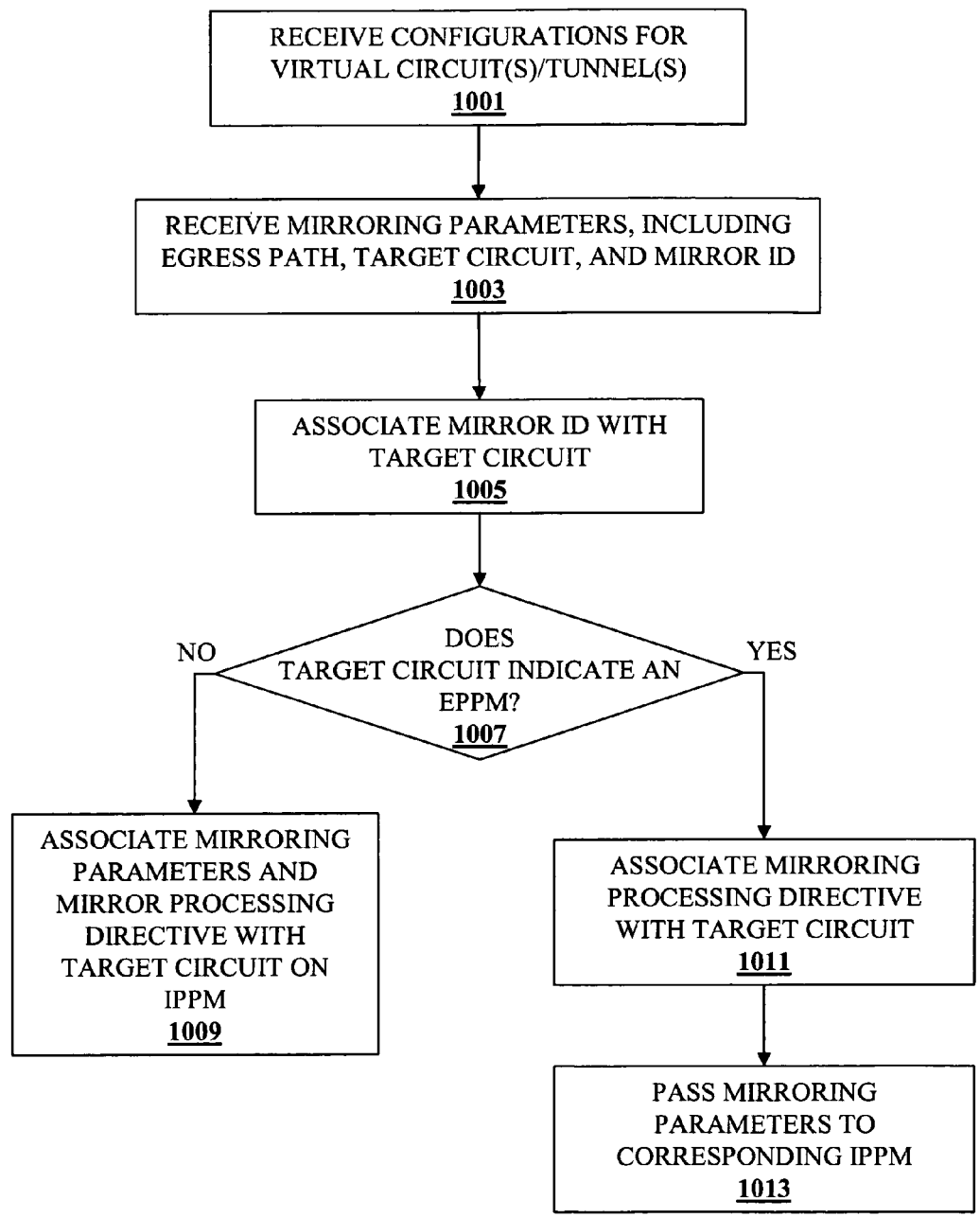
FIG. 10 is an exemplary flowchart for configuring mirroring on a network element according to one embodiment of the invention.

FIG. 10 is an exemplary flowchart for configuring mirroring on a network element according to one embodiment of the invention. At block 1001, configuration for a virtual circuit(s)/tunnel(s) are received. At block 1003, mirroring parameters that include an egress path, a target circuit, and a mirror identifier, are received. At block 1005, the mirror identification is associated with the target circuit. At block 1007, it is determined if the target circuit indicates an EPPM. If the target circuit indicates an EPPM, then control flows to block 1011. If the target circuit does not indicate an IPPM, then control flows to block 1009.

At block 1009, the mirroring parameters and a mirroring processing directive are associated with the target circuit on the IPPM indicated by the target circuit.

At block 1011, a mirroring processing directive is associated with the target circuit. At block 1013, the mirroring parameters are passed to the corresponding IPPM local to the target circuit's EPPM.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.). For example, in FIG. 4, block 405 may be performed before block 413. Referring to FIG. 6, block 605 may be performed before block 609, block 613 may be performed before block 609, both blocks 605 and block 613 may be performed before block 609, etc. Referring to FIG. 7B, block 737 may be performed before block 741, block 741 may not be performed, block 743 may be performed after block 739 and before block 741, etc.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

We claim:

1. A method in a network element comprising:
   duplicating a packet associated with a virtual path, said virtual path associated with a physical path and a virtual path identifier;
   determining if processing of the original packet satisfies a mirroring criteria, wherein the mirroring criteria includes one or more of forwarded, dropped, denied and allowed;
   deleting the duplicate packet only if the original packet does not satisfy the mirroring criteria; and
   if the original packet satisfies the mirroring criteria, then forwarding the duplicate packet as indicated by a mirror path associated with the virtual path, said mirror path indicating a virtual egress path.

2. The method of claim 1 wherein the mirroring criteria are indicated in an access control list.

3. The method of claim 2 wherein the access control list is associated with the virtual path.

4. The method of claim 1 wherein the virtual path is a virtual circuit.

5. The method of claim 1 further comprising classifying the duplicate packet by selecting an entry in a mirror classification structure that stores classifications and corresponding forwarding destinations.

6. The method of claim 5 wherein said classifying comprises:
processing the original packet;
determining classification based on processing of the original packet; and
storing the classification.

7. A network element comprising:
a control card to receive a first set of configurations that indicate a first virtual path and a second virtual path, a second set of configurations that indicate the first virtual path as a mirroring path, a set of one or more mirroring criteria, and a third set of configurations that associate the second virtual path with the mirroring criteria, said first set of configurations to indicate a physical path for the first virtual path; and
a set of one or more line cards coupled with the control card, a first of the set of line cards to receive the set of mirroring criteria and the second virtual path, the first line card having a set of instructions to cause the first line card to duplicate a packet of a stream of packets and then to forward the duplicate packet in accordance with the set of mirroring criteria along a mirroring path only if the original packet satisfies the set of mirroring criteria, wherein the set of mirroring criteria includes one or more of forwarded, dropped, denied and allowed.

8. The network element of claim 7 wherein the first and second virtual paths are layer 2 paths.

9. The network element of claim 7 further comprising a transmission medium coupled with the set of line cards and the control card.

10. The network element of claim 7 wherein the first line card includes:
an ingress packet processing module (IPPM), the IPPM to duplicate the packet and forward the duplicate packet; and
an egress packet processing module (EPPM) coupled with the IPPM, the EPPM to receive a second packet and to duplicate the second packet.

11. The network element of claim 10 wherein the first line card further has a loopback channel between the IPPM and the EPPM.

12. A network comprising:
a first host transmitting a stream of packets;
a first network element communicatively coupled with the first host, receiving the stream of packets, duplicating each packet of the stream of packets, for each packet of the stream of packets whose processing satisfies a mirroring criteria, forwarding their corresponding duplicate packet along an egress path indicated as a mirror path, and for each of the stream of packets whose processing does not satisfy the mirroring criteria, clearing their corresponding duplicate packet, wherein the mirroring criteria includes one or more of forwarded, dropped, denied and allowed; and
a second host communicatively coupled with the first network element, the second host receiving those duplicate packets forwarded along the mirror path.

13. The network of claim 12 wherein the second host analyzes the received duplicate packets.

14. The network of claim 12 wherein the mirror path is a tunnel.

15. The network of claim 14 wherein the tunnel is a multiprotocol label switching tunnel.

16. A set of one or more machine-readable medium that provides instructions, which when executed by a set of one or more processors, cause said set of processors to perform operations comprising:
classifying a duplicate packet based on processing of an original packet to select a set of forwarding information for the duplicate packet, said duplicate packet being a duplicate of said original packet; and
forwarding the duplicate packet in accordance with the set of forwarding information conforming to the classification of the duplicate packet if the original packet satisfied a mirroring criteria, wherein the mirroring criteria includes one or more of forwarded, dropped, denied and allowed, the set of forwarding information retrieved from a mirror classification structure that has stored therein classifications and corresponding forwarding information.

17. The machine-readable medium of claim 16 wherein the mirroring criteria are indicated in an access control list.

18. The machine-readable medium of claim 17 wherein the access control list is associated with a virtual circuit that is associated with the original packet.

19. The machine-readable medium of claim 16 wherein the forwarding information includes a forwarding destination and a mode.

20. The machine-readable medium of claim 19 wherein the mode indicates whether the duplicate packet is to be forwarded only if the original packet is forwarded, only if the original packet is dropped, or that all packets are to be forwarded.

21. The machine-readable medium of claim 16 wherein classification comprises:
processing the original packet;
determining classification based on processing of the original packet; and
storing the classification.

22. A set of one or more machine-readable medium that provides instructions, which when executed by a set of one or more processors, cause said set of processors to perform operations comprising:
duplicating a packet of a stream of packets; and
selectively forwarding the duplicate packet in accordance with a first set of forwarding information used for packet mirroring based on whether processing of the original packet satisfies a set of mirroring criteria, wherein the set of mirroring criteria includes one or more of forwarded, dropped, denied and allowed, said first set of forwarding information being different than a second set of forwarding information used to forward the original packet, the first set of forwarding information retrieved from a mirror classification structure.

23. The machine-readable medium of claim 22 wherein said duplicating is done in accordance with mirroring criteria.

24. The machine-readable medium of claim 23 wherein the mirroring criteria are indicated in an access control list.

25. The machine-readable medium of claim 24 wherein the access control list is associated with a virtual circuit that is associated with the original packet.

26. The machine-readable medium of claim 22 wherein the first set of forwarding information includes forwarding destinations and modes.

27. The machine-readable medium of claim 26 wherein the mode indicates whether the duplicate packet is to be forwarded only if the original packet is forwarded, only if the original packet is dropped, or that all packets are to be forwarded.

28. The machine-readable medium of claim 22 further comprising classifying the duplicate packet and determining the first set of forwarding information in accordance with said classification.

29. The machine-readable medium of claim 28 wherein said classifying comprises:
   processing the original packet;
   determining classification based on processing of the original packet; and
   storing the classification.

30. A set of one or more machine-readable medium that provides instructions, which when executed by a set of one or more processors, cause said set of processors to perform operations comprising:
   duplicating a packet associated with a virtual path, said virtual path associated with a physical path and a virtual path identifier;
   determining if processing of the original packet satisfies a mirroring criteria, wherein the mirroring criteria includes one or more of forwarded, dropped, denied and allowed;
   deleting the duplicate packet only if the original packet does not satisfy the mirroring criteria; and
   if the original packet satisfies the mirroring criteria, then forwarding the duplicate packet as indicated by a mirror path associated with the virtual path, said mirror path indicating a virtual egress path.

31. The machine-readable medium of claim 30 wherein the mirroring criteria are indicated in an access control list.

32. The machine-readable medium of claim 31 wherein the access control list is associated with the virtual path.

33. The machine-readable medium of claim 30 wherein the virtual path is a virtual circuit.

34. The machine-readable medium of claim 30 further comprising classifying the duplicate packet by selecting an entry in a mirror classification structure that stores classifications and corresponding forwarding destinations.

35. The machine-readable medium of claim 34 wherein said classifying comprises:
   processing the original packet;
   determining classification based on processing of the original packet; and
   storing the classification.

36. A method comprising:
   selectively mirroring, in a single network element, on a per-packet basis, a stream of packets by performing the following for each original packet of the stream,
      duplicating the original packet to create a duplicate packet,
      determining whether processing of the original packet satisfies a set of mirroring criteria, wherein said set of mirroring criteria includes one or more of forwarded, dropped, denied and allowed, and
      forwarding on a mirror path or dropping the duplicate packet based on said determining.

37. The method of claim 36 wherein the mirroring criteria are indicated in an access control list.

38. The method of claim 36 wherein the mirror path is a tunnel.

39. The method of claim 38 wherein the tunnel is a multiprotocol label switching tunnel.

\* \* \* \* \*